(12) United States Patent
Iwasaki

(10) Patent No.: US 6,360,799 B1
(45) Date of Patent: Mar. 26, 2002

(54) PNEUMATIC TIRE WITH SIDEWALL REINFORCING RUBBER AND BEAD REINFORCING LAYER OF APPROXIMATELY CIRCUMFERENTIAL CORDS

(75) Inventor: Shizuo Iwasaki, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/650,652

(22) Filed: Aug. 30, 2000

(30) Foreign Application Priority Data

Sep. 10, 1999  (JP) .......................................... 11-256552

(51) Int. Cl.[7] .......................... B60C 15/06; B60C 17/00
(52) U.S. Cl. ...................... 152/517; 152/543; 152/555
(58) Field of Search ................................. 152/517, 555, 152/543

(56) References Cited

U.S. PATENT DOCUMENTS 5,529,104 A * 6/1996 Delias et al. ........... 152/543 X

FOREIGN PATENT DOCUMENTS

GB 2 138 367 A * 10/1984 ................ 152/517

* cited by examiner

Primary Examiner—Adrienne C. Johnstone
(74) Attorney, Agent, or Firm—Sughrue Mion, PLLC

(57) ABSTRACT

A pneumatic tire comprises a tread portion, a pair of sidewall portions, a pair of bead portions, and at least one carcass ply toroidally extending between a pair of bead cores and wound around the bead core to form a turnup portion, in which a reinforcing rubber having substantially a crescent shape at its lateral section is disposed at an inside of the sidewall portion and a cord reinforcing layer containing cord(s) extending in a direction of approximately 90° with respect to a radial line segment is disposed in at least a bead portion.

3 Claims, 1 Drawing Sheet

PNEUMATIC TIRE WITH SIDEWALL REINFORCING RUBBER AND BEAD REINFORCING LAYER OF APPROXIMATELY CIRCUMFERENTIAL CORDS

BACKGROUND OF THE INVENTION

1. Field of the Invention

This invention relates to a pneumatic tire, and more particularly to an improvement of a run-flat tire wherein a runnable distance in the puncture of the tire or so-called run-flat running distance can largely be extended while controlling the increase of tire weight.

2. Description of Related Art

As the run-flat tire capable of temporarily running in the puncture of the tire, there have hitherto been proposed tires of various types, a part of which has already been commercialized.

In the conventionally proposed run-flat tires, however, the considerable increase of tire weight is unavoidable for improving the run-flat running performance. Particularly, there is a case that the tire weight is increased by about 30%.

For example, there is a run-flat tire having such a type that a reinforcing rubber having substantially a crescent shape at its lateral section is disposed at an inside of a sidewall portion of the tire and contributed to bear a weight of a vehicle body in the puncture of the tire to thereby avoid stress concentration into the sidewall portion of the tire. In this case, as the thickness of the reinforcing rubber becomes thicker, the run-flat running distance is extended, but the tire weight is increased to bring about the degradation of fuel consumption, increase of rolling resistance, degradation of ride comfort on the vehicle and degradation of other performances.

SUMMARY OF THE INVENTION

It is, therefore, an object of the invention to solve the aforementioned problems of the conventional technique and to provide a pneumatic tire in which the run-flat running distance in the run-flat tire of the above type can largely be extended by advantageously controlling the increase of the reinforcing rubber thickness and hence the tire weight.

According to the invention, there is the provision of a pneumatic tire comprising a tread portion, a pair of sidewall portions connecting to both side ends of the tread portion and extending inward in a radial direction of the tire, a pair of bead portions each arranged at an inner peripheral side of the sidewall portion, and at least one carcass ply toroidally extending between a pair of bead cores embedded in the respective bead portion and turned up around the bead core from an inside toward outside in the radial direction, in which a reinforcing rubber having substantially a crescent shape at its lateral section is disposed at an inside of the sidewall portion and a cord reinforcing layer containing cord(s) extending in a direction of approximately 90° with respect to a radial line segment is disposed in at least a bead portion.

In the pneumatic tire according to the invention, the reinforcing rubber mainly disposed at the inside of the sidewall portion while contacting with an inner face of the sidewall portion is contributed to bear the vehicle weight in the puncture of the tire as previously mentioned, whereby the stress concentration into the sidewall portion and the carcass ply can be advantageously prevented in the puncture. In the invention, the cord reinforcing layer of organic fiber cord or steel cord is disposed in at least a bead portion, so that the run-flat running distance can be largely extended under an increase of the weight considerably smaller than the increase of the reinforcing rubber thickness.

That is, the cord reinforcing layer can effectively support the vehicle weight in the puncture of the tire because when the tire is subjected to crushing deformation in the puncture, the vehicle weight in the puncture is supported based on a high tensile strength of the cord in the cord reinforcing layer extending substantially in a circumferential direction against deformation in such a direction that the sidewall portion expands outward in a widthwise direction of the tire, and falling-down of the carcass ply outward in the widthwise direction is effectively restrained under a large crossed angle defined between the cord of the cord reinforcing layer and the cord of the carcass ply in at least the bead portion, and also the cord reinforcing layer functions to obstruct the separation between mutual cords in the carcass ply accompanied with the above expansion deformation of the sidewall portion.

Further, the cord in the cord reinforcing layer is extended in a direction of approximately 90° with respect to a radial line segment and substantially continued in the circumferential direction, so that tension can be advantageously born by such a cord. On the other hand, if the extending angle is not more than 80°, the cord bearing tension is discontinued at inner and outer ends in the radial direction, so that the sufficient effect is not developed and the adhesion at the end portion of the cord is insufficient to cause a fear of separation failure.

In the pneumatic tire according to the invention, therefore, the effective extension of the run-flat running distance can be realized by advantageously controlling the expansion deformation of the sidewall portion under the action of the cord reinforcing layer without increasing the thickness of the reinforcing rubber, and also the increase of the tire weight can be controlled to a minimum as far as possible.

In a preferable embodiment of the invention, the cord reinforcing layer has a spirally winding structure of one or more cords. In this case, a joint part is not existent in the cord of the cord reinforcing layer, so that tension is sufficiently born by the cord as mentioned above and the falling deformation of the bead portion can be more effectively restrained. Particularly, when the cord reinforcing layer has a spirally winding structure of plural cords arranged side by side in the radial direction, the formation of the cord reinforcing layer can be facilitated.

In another preferable embodiment of the invention, the cord reinforcing layer is disposed at an outside of the turnup portion of the carcass ply wound around the bead core from the inside toward the outside in the radial direction of the tire. In this case, the formation of the cord reinforcing layer can be more facilitated in connection with the arranging position of the cord reinforcing layer. And also, the cord reinforcing layer is positioned outside a neutral axis, so that it develops a high tensile resistance to the falling deformation of the bead portion and hence the cord reinforcing layer more effectively contributes to support the vehicle weight in the puncture of the tire.

BRIEF DESCRIPTION OF THE DRAWING

The invention will be described with reference to the accompanying drawing, wherein.

PREFERRED EMBODIMENTS OF THE INVENTION

Figure 1:
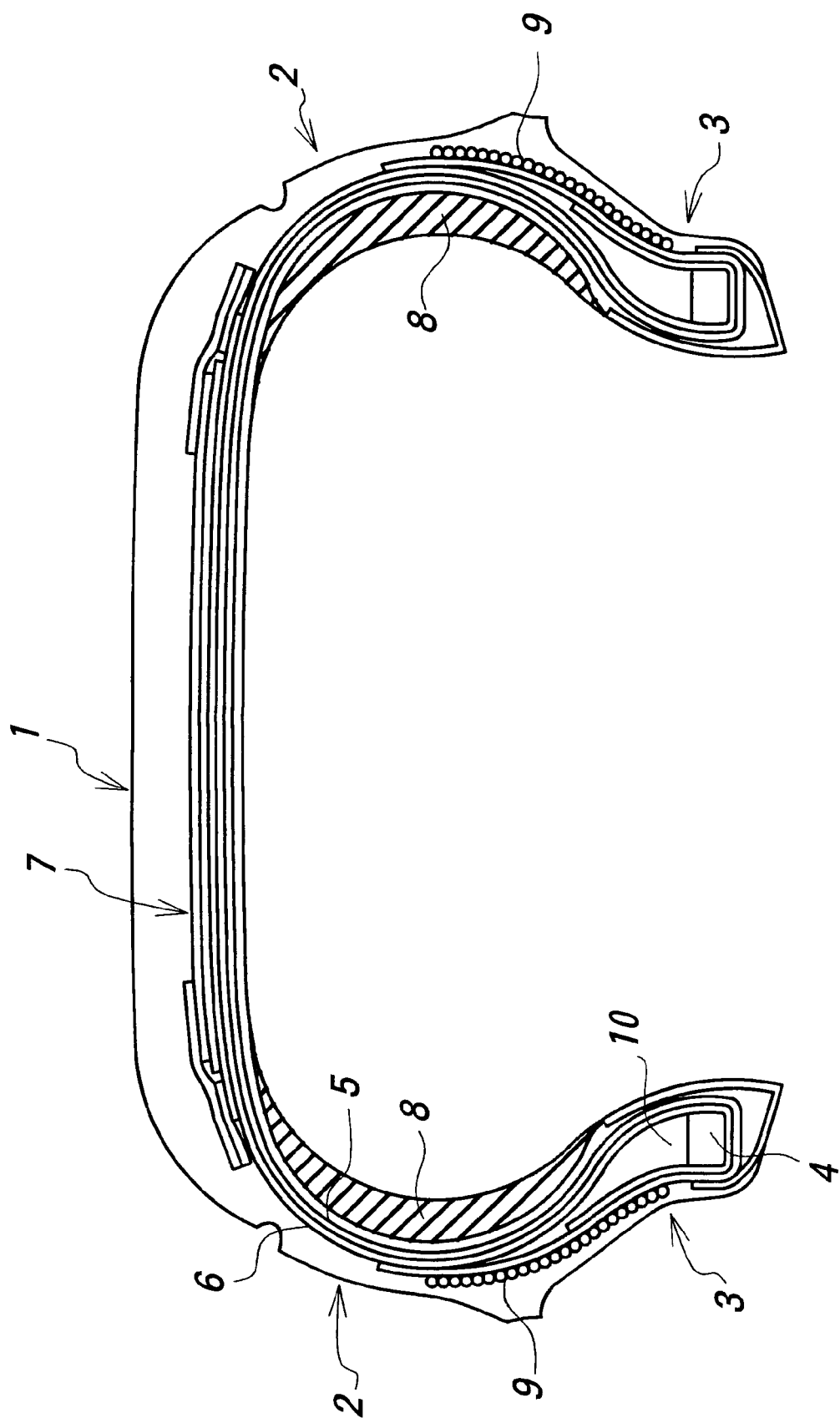
FIG. 1 is a diagrammatically section view of an embodiment of the pneumatic tire according to the invention.

In FIG. 1 is shown an embodiment of the pneumatic radial tire according to the invention, wherein numeral 1 is a tread portion, numeral 2 a sidewall portion connecting to each side end of the tread portion 1 and extending inward in a radial direction of the tire, and numeral 3 a bead portion connecting to an inner peripheral side of the sidewall portion 2.

In this tire, at least one carcass ply, two carcass plies 5, 6 in the illustrated embodiment are toroidally extended between a pair of bead cores 4 embedded in the respective bead portions 3 to reinforce these portions 1, 2 and 3. A side end portion of each carcass ply is wound around the bead core 4 from an inside toward an outside in a widthwise direction of the tire to form a turnup portion. And also, a belt 7 comprised of at least one belt layer is arranged on an outer periphery of a crown portion of the carcass ply.

Moreover, each of the carcass plies 5, 6 contains cords arranged substantially in the radial direction therein.

Furthermore, a reinforcing rubber 8 having substantially a crescent shape at its lateral section is mainly arranged at an inside of the sidewall portion 2 so as to contact with the inner face of the sidewall portion 2. At the same time, a cord reinforcing layer 9 extending in a direction of approximately 90° with respect to a radial line segment and comprised of organic fiber cords or steel cords is disposed at an outside of the turnup portion of the carcass ply 5 over a zone ranging from the bead portion 3 to the sidewall portion 2, particularly in a region between an outer peripheral side of the bead core 4 and an inner peripheral side from a turnup end of the carcass ply positioned outermost in the radial direction in the illustrated embodiment.

Moreover, the cord reinforcing layer 9 may be disposed at an outside of a bead filler 10 arranged between a main body and a turnup portion of the carcass ply (5, 6). In other words, the cord reinforcing layer 9 may be disposed between the bead filler 10 and the turnup portion of the carcass ply (5, 6). Even in any case, the cord reinforcing layer 9 is preferable to have a spirally winding structure of one or more cords.

According to the pneumatic radial tire having the above structure, the vehicle weight can be effectively supported by the cord reinforcing layer 9 in addition to the reinforcing rubber 8 in the puncture of the tire as previously mentioned, so that it is possible to largely extend the run-flat running distance under a slight weight increase resulted from the arrangement of the cord reinforcing layer 9 without substantially increasing the thickness of the reinforcing rubber 8.

The following examples are given in illustration of the invention and are not intended as limitations thereof.

There are provided radial tires having a tire size of 275/40R17 for Examples 1 and 2 and Comparative Examples 1 to 3, and the tire weight and run-flat running distance are measured with respect to these tires.

The example tires have a structure shown in FIG. 1, while the comparative tires have a structure shown in FIG. 1 except that the cord reinforcing layer is omitted. Moreover, the cord reinforcing layer used in the example tires has a spiral winding structure of a single cord.

The tire weight is obtained by directly measuring the resulting tire. On the other hand, the run-flat running distance is obtained by measuring a running distance when a passenger car (type of motor vehicle: Corvette) provided with four tires is run on a circuit course of an ellipsoidal form at a speed of 40 km/h until the occurrence of trouble in the test tire mounted on a left front wheel under condition that a valve core of the left front-wheeled tire is removed out and the other tires are inflated under a given internal pressure. The measured results are shown in Table 1.

TABLE 1

|  | Comparative Example 1 | Comparative Example 2 | Example 1 | Example 2 | Comparative Example 3 |
|---|---|---|---|---|---|
| Maximum thickness of reinforcing rubber (mm) | 3 | 6 | 3 | 6 | 9 |
| Cord reinforcing layer | none | none | nylon cord | nylon cord | none |
| Tire weight (kg/tire) | 14.2 | 14.6 | 14.4 | 14.8 | 15.9 |
| Run-flat running distance (km) | 15 | 68 | 163 | 308 | 144 |

As seen from Table 1, all example tires can be run over a distance of more than 150 km in the puncture of the tire with the slight increase of tire weight.

As mentioned above, according to the invention, the run-flat running distance can be largely extended while effectively controlling the increase of the tire weight under the action of the cord reinforcing layer.

What is claimed is:

1. A pneumatic run-flat tire comprising a tread portion, a pair of sidewall portions connecting to both side ends of the tread portion and extending inward in a radial direction of the tire, a pair of bead portions each arranged at an inner peripheral side of the sidewall portion, and at least one carcass ply toroidally extending between a pair of bead cores embedded in the respective bead portion and turned up around the bead core from an inside toward outside in the radial direction, in which a reinforcing rubber having substantially a crescent shape at its lateral section is disposed at an inside of the sidewall portion and a cord reinforcing layer containing at least one cord extending in a direction of approximately 90° with respect to a radial line segment is disposed in at least a bead portion.

2. A pneumatic tire according to claim 1, wherein the cord reinforcing layer has a spirally winding structure of the one or more cords.

3. A pneumatic tire according to claim 1, wherein the cord reinforcing layer is disposed at an outside of a turnup portion of the carcass ply wound around the bead core from an inside toward an outside in the radial direction of the tire.

\* \* \* \* \*